(12) United States Patent
Taori et al.

(10) Patent No.: US 9,825,780 B2
(45) Date of Patent: Nov. 21, 2017

(54) METHOD AND SYSTEM FOR PROVIDING INFORMATION OF RELATED COMMUNICATION SESSIONS IN HYBRID TELECOMMUNICATION NETWORKS

(75) Inventors: Rakesh Taori, Gyeonggi-Do (KR); Yun Chao Hu, Bromma (SE); Rogier August Caspar Joseph Noldus, Goirle (NL); Jos den Hartog, Capelle a/d Ijssel (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2081 days.

(21) Appl. No.: 11/572,981

(22) PCT Filed: Jul. 28, 2005

(86) PCT No.: PCT/EP2005/008163
§ 371 (c)(1),
(2), (4) Date: Apr. 23, 2007

(87) PCT Pub. No.: WO2006/010613
PCT Pub. Date: Feb. 2, 2006

(65) Prior Publication Data
US 2008/0062966 A1    Mar. 13, 2008

Related U.S. Application Data

(60) Provisional application No. 60/592,426, filed on Jul. 30, 2004.

(51) Int. Cl.
*H04L 12/66*    (2006.01)
(52) U.S. Cl.
CPC ..................... *H04L 12/66* (2013.01)

(58) Field of Classification Search
None
See application file for complete search history.

(56) References Cited

U.S. PATENT DOCUMENTS 6,353,740 B1 *   3/2002   Granberg .................. 455/432.1
6,526,043 B1 *   2/2003   Fogelholm et al. .......... 370/352
(Continued)

FOREIGN PATENT DOCUMENTS

JP    2003-234851       8/2003
WO    WO03/065654 A     8/2003
(Continued)

*Primary Examiner* — Faruk Hamza
*Assistant Examiner* — Cassandra Decker

(57) ABSTRACT

Combinational networks may provide simultaneous connectivity over networks of different network types between user equipment. A communication session, comprising a circuit switched call and one or more packet switched sessions, may be deployed simultaneously over different network types, in relation to the same user equipment. The circuit switched call and the packet switched session can be correlated, in which case the communication session is regarded as a combinational session. By introducing a number of logical databases that contain actual data on network addresses and communication sessions, a correlation check is deployed applied by a correlation node. The check consists of a number of queries towards said databases or to other network entities, yielding whether the communication session is to be regarded as combinational. The result of the check may e.g. be deployed in an on-line combinational charging system.

30 Claims, 2 Drawing Sheets

(56) References Cited

U.S. PATENT DOCUMENTS

| | | | |
|---|---|---|---|
| 6,980,793 B2* | 12/2005 | Lee | 455/406 |
| 7,099,288 B1* | 8/2006 | Parker et al. | 370/259 |
| 7,221,940 B2* | 5/2007 | Kaneko et al. | 455/435.1 |
| 7,233,786 B1* | 6/2007 | Harris et al. | 455/412.1 |
| 7,647,374 B2* | 1/2010 | Rajahalme et al. | 709/204 |
| 2002/0078194 A1* | 6/2002 | Neti et al. | 709/224 |
| 2002/0102962 A1* | 8/2002 | Grinn et al. | 455/406 |
| 2002/0194331 A1* | 12/2002 | Lewis et al. | 709/224 |
| 2003/0182431 A1* | 9/2003 | Sturniolo et al. | 709/227 |
| 2005/0165719 A1* | 7/2005 | Greenspan et al. | 707/1 |
| 2005/0190747 A1* | 9/2005 | Sindhwani et al. | 370/352 |

FOREIGN PATENT DOCUMENTS

| | | | |
|---|---|---|---|
| WO | WO03/073782 A | 9/2003 | |
| WO | 2004/006131 A1 | 1/2004 | |

* cited by examiner

METHOD AND SYSTEM FOR PROVIDING INFORMATION OF RELATED COMMUNICATION SESSIONS IN HYBRID TELECOMMUNICATION NETWORKS

This application claims the benefit of U.S. Provisional Application No. 60/592,491, filed Jul. 30, 2004, the disclosure of which is fully incorporated herein by reference.

FIELD OF THE INVENTION

The present invention relates generally to telecommunications systems, such as fixed, wireless or hybrid communication systems, having a packet- and circuit-switched architecture denoted as combinational networks. More particularly, the present invention facilitates a method for supporting a correlation establishment of two or more communication sessions, present or being established at the packet- and circuit-switched parts of said networks in an efficient way.

BACKGROUND OF THE INVENTION

Fixed- and especially mobile-networks, such as Global System for Mobile communications (GSM), General Packet Radio System (GPRS) or Universal Mobile Telecommunication System (UMTS) are constantly evolving. GSM/GPRS and UMTS networks today offer both Circuit Switched (CS) connectivity and Packet Switched (PS) connectivity. The PS end-to-end connectivity with its capabilities for transmission of a wide range of data types may be used for offering multimedia services such as image, music and video transfer. The CS connectivity provides a link between two user equipment, or one or more terminals comprised by the user equipment, by means of one or more trusted network-nodes with a reliable and defined Quality of Service (QoS) for e.g. voice traffic.

Combinational networks, where at least two or more links of at least two different network types e.g. CS or PS, to one or more user equipment or terminals are established, are capable to deploy simultaneously both CS and PS connectivity to a user equipment or terminal, thereby facilitating services which perform their activity through PS-communication sessions, denoted as PS-sessions and CS communication sessions, denoted as CS-calls.

Services within a combinational network comprising networks of different network types such as a CS-network and a PS-network are denoted as combinational services. These combinational services which combine the traditional Circuit switched (CS) services with the emerging packet switched (PS) domain services, are being envisaged as the first pragmatic step to a network where all services will be provided by a PS domain architecture.

A network operator offering these combinational services would need a mechanism of charging the usage of these services, however methods to charge these combinational services are not yet in place. Hence a mechanism needs to be introduced to charge the end-users for usage of such combinational services.

Methods for charging a CS-call (post-paid as well as prepaid) are known. Methods also exist for packet based charging e.g. the Ericsson Flexible Bearer charging, or more generally known as Flow based charging.

What makes charging for a combinational service different from charging the components of a combinational service individually, is the additional flexibility and the desire indicated by operators to be able to charge for an aggregate service composed of a CS borne service and one or more PS borne services as opposed to native and established charging capabilities for CS and PS domains.

For example, if an A-party has an ongoing CS-call with a B-party, it should be possible for the A-party and the B-party to send pictures to each other and the resulting combinational call would be charged differently compared to the case whereby an Internet Protocol Multimedia Subsystem (IMS) session for the purpose of the picture transfer, is set up in isolation.

Methods do not exist for charging combinational services where a charging rate depends on services being correlated. While it is an option to limit combinational charging to charging for CS-calls and PS-session flows separately, there is no mechanism to introduce flexibility that makes it possible for an operator to apply charging a combination of a simultaneous CS-call and a PS-session by the same subscriber differently from prior art charging solutions where the CS-call and the PS-session are charged independently. Charging a combinational service, requires a check that the CS-call and the PS-domain based IMS-service are related to the same subscriber, and the CS-call and the PS-session are correlated to each other in that the same A-party and B-party are involved in the CS-call and the PS-session.

If charging events belonging to a CS-call, such as A-party-number, B-party-number, start-of-call timestamp and end-of-call timestamp, and charging events belonging to a PS-session towards an IMS service, such as start-of-transfer, amount-of-data and Session Initiation Protocol Universal Resource Identifier (SIP-URI), are stored and processed offline, it is not always possible to verify that the events belonged to a combinational call wherein the CS-call and the PS-session are correlated. In any case, establishing the aforementioned correlation in real time is likely to be more reliable than establishing this correlation offline.

As to verify whether a CS-call and a PS-session are correlated and hence combinational, a real-time check should be executed but the state of the art does not provide any solution that is effective, simple to implement and reliable.

Furthermore from a subscriber's point of view point, it should be ensured that any costs generated for the PS-session are billed in a reliable and trusted way in relation to his/her CS-call.

The problem the invention seeks a solution to is formulated as how to provide a method of checking the correlation of a simultaneous CS-call and one or more PS-sessions being deployed by a subscriber within a combinational telecommunication network.

Furthermore, any solution to said problem must fulfil as a requirement that the correlation check between the CS-call and the PS-session(s) shall not place additional requirements on the subscriber, i.e. the subscriber shall be able to spontaneously place a CS-call or start up a PS-session not knowing whether he/she will initiate another, related CS- or PS-service later during that call or session.

SUMMARY OF THE INVENTION

It is an object of the present invention to provide a method of checking a correlation of communication sessions present in a combinational network comprising networks of different network types being a CS-network and at least one PS-network, where said communication sessions being a CS-call at the CS-network and a PS-session at the PS-network are related to a party having a user equipment deploying said sessions at different types of networks.

It is a further object of the present invention to provide a network node, denoted as correlation node, which is arranged for performing said checking of the correlation between said sessions by means of the method provided.

These objects are achieved by the present invention by means of a method of providing information of related communication sessions to a subsystem (e.g. a charging system) within a telecommunications system with a CS-network and one or more PS-networks, where a first user equipment has said related communication sessions to network entity via the networks of different network type. The providing of information is executed by a network node, which establishes that the communication sessions are present, determines a correlation between the communication sessions and provides the determined correlation to the subsystem.

The establishing of the presence of the communication sessions comprises further steps of retrieving the network addresses of the first user equipment and the network entity via a CS-network and via a PS-network, and verifying the presence of communication sessions on both network types.

The invention provides a "real-time combinational check", wherein it is verified that the CS-call and the PS-session with an IMS based service originate in one User Equipment and terminate in a network entity such as another User Equipment. This "real-time combinational check" combines information available from several "logical databases".

By means of an implementation of the method provided by the invention, a correlation check between the CS-call and the PS-session(s) is realised, such that it is unambiguously established that the CS-call and the PS-session, such as a deployed IMS service, are combinational. A subsystem as e.g. the charging subsystem performs the presented check as to determine how a communication session of a subscriber is charged. In order to ensure that this check is performed in real-time during the communication sessions, a system is provided where ongoing calls are logged in real-time. This system is also characterised in that it is queried for the status of the CS-call and the PS-session in real-time mode, in a number of ways. Responses to the queries are either Boolean or descriptive.

The invention is pointed to combinational services that are composed of a CS-call and one or more PS-sessions in relation to PS-domain borne services. Combinational charging, as presented by the invention is just one of the examples of a combinational service.

These and other embodiments according to the present invention are now illustrated in more detail with reference to the enclosed drawings.

DETAILED DESCRIPTION

Without restrictions to the scope of the invention, in order to provide a thorough understanding of the present invention, the invention is presented against the background and within the scope of the current implementation of mobile communication system deployed in a combinational network environment. However, the present invention may be deployed in any communication system comprising combinational networks.

Suppose that two users, an A-party and a B-party, have communication sessions ongoing between each other. Said communication sessions between the A-party and the B-party consist of a CS-call provided by the CS-network and a PS-session provided by the PS-network, both communication sessions regarded as "communication components". The said components may be set up one after the other, in an arbitrary order, or simultaneously. User Equipment (UE) used by the A-party and UE used by the B-party shall allow for CS- and PS-communication sessions simultaneously, which is referred to as dual mode communication. The said dual mode capability is either present in a single device or in a multitude of devices, such as a split UE arrangement where said dual mode UE comprises e.g. a mobile phone and a Personal Computer (PC).

Messages exchanged between said parties to establish communication and/or during communication may be intercepted and modified by a "Service Network" comprising network entities having connections to networks of different network types within the combinational network.

Figure 1:
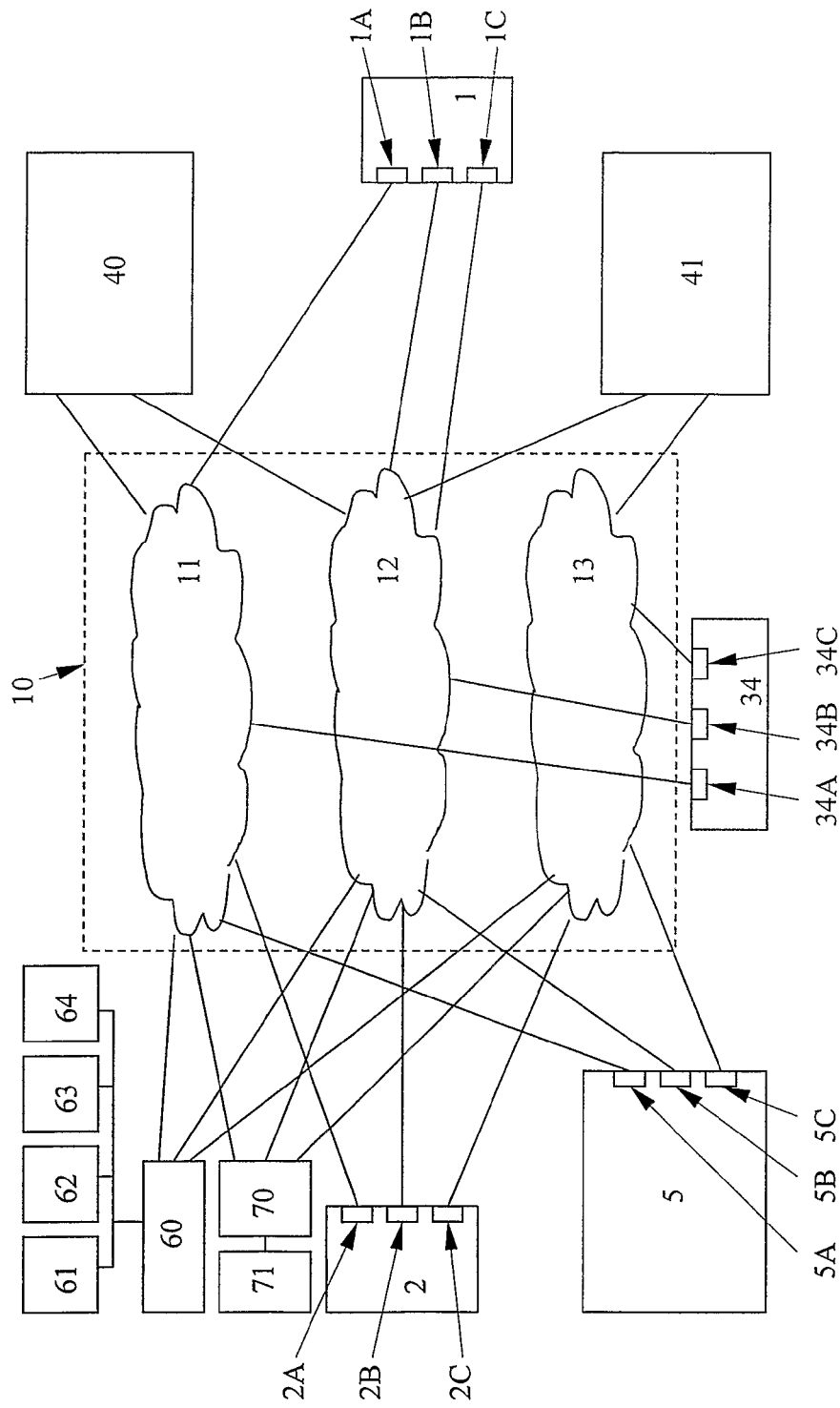
FIG. 1 presents a schematic diagram of a combinational network with two user equipment connected to the network.

FIG. 1 illustrates schematically a combinational network 10 comprising several networks 11, 12, 13 of different network types, with a first UE 1 and a second UE 2 connected to all or some of the networks 11, 12, 13. As to provide a physical connection to the networks 11, 12, 13, the UE 1, 2 has network connections 1A, 1B, 1C, 2A, 2B, 2C, each associated with a network address, towards said networks 11, 12, 13.

For the explanation of the invention, it is arbitrarily assumed that network 11 is a network of a CS-network type, and networks 12 and 13 are of a PS-network type.

In the description below, it will be explained how a correlation of a CS-call with a PS-session, set up and maintained by UE 1 towards UE 2 or a network service node 34, is checked. Network service node 34 has network connections 34A, 34B, 34C, each associated with a network address, towards said networks 11, 12, 13. UE 1 may alternatively have communication sessions with the network service node 34, where the node 34 acts as a content server.

For an explanation of the invention it is assumed that:
the A-party has by means of his/her UE 1 communication sessions towards B-party's UE 2.
the UE 1, 2 are Dual Transfer Mode (DTM) terminals or Multi-Radio Access Bearer (RAB) UE wherefrom a CS-call and PS-session originates or whereto a CS-call and PS-session terminate.
The CS communication component of the combinational service is a voice/video CS-call and this CS-call is identified by a pair of CS-domain network addresses such as Mobile Station Integrated Services Digital Network (MSISDN) numbers. These numbers are identified as MSISDN(A) for the A-party and MSISDN(B) for the B-party
An IP Multimedia Subsystem (IMS, as defined by 3GPP) service, ongoing between the A-party and the B-party, is identified using the Session Initiation Protocol-Universal Resource Identifier (SIP-URI) pair, as SIP-URI(A) for the A-party and SIP-URI(B) for the B-party.

Network elements 61, 62, 63, 64 having database capability are connected to all the networks 11, 12, 13 comprised within the combinational network 10, via mediator unit 60.

Subsystems as charging subsystem 40, or authentication node 41, comprise connections to the CS-network 11 and the PS-network 12.

Suppose that the A-party, with UE 1 makes a CS-voice-call to the B-party having UE 2. The CS-call is logged into a logical "ongoing CS-calls" database 63 that keeps records of the ongoing CS-calls. The charging subsystem 40 applies either online charging via the connection to the CS-network 11, or a CS-service present at the CS-network 11 is used to fetch call detail records. The charging subsystem 40 is notified about the "events" that are relevant for charging, such as "start of call" and "end of call".

After the establishment of the CS-call, the A-party decides to set up an IMS session, being a PS-session, with the B-party. The IMS service residing within the PS-network 12 sends a "PS service charging event" to the charging subsystem 40. In this event, information like service-type, SIP-URI(A), SIP-URI(B) is sent by the IMS service and logged into the "logical database" ongoing IMS sessions 61. It is up to the charging subsystem 40, to check or to have checked whether this PS-session is related to an ongoing CS-call, i.e. check whether it is "combinational". To perform this check, information from the several "logical databases" 61, 62, 63, and 64 must be combined.

The logical databases 61, 62, 63, 64 have recorded and stored specific relations as:
61: SIP-URI(A)–SIP-URI(B)=ongoing IMS-sessions
62: MSISDN(x)–IP-address(x)=MSISDN number, Public Switched Telecommunications Network (PSTN) number, Virtual Private Network (VPN) number versus IP address, e.g. of an DTM-terminal
63: MSISDN(A)–MSISDN(B)=ongoing CS-calls
64: SIP-URI(x)–IP(x)=IMS-registration on device
These logical databases 61, 62, 63 and 64 are queried as to provide information required to perform a reliable "combinational" check.

"Logical" database 62 comprises specific relations of MSISDN numbers regarded as CS-domain network addresses and PS-domain IP-addresses regarded as PS-domain addresses. A UE such as a DTM terminal comprises both domain types of addresses in a single terminal. A UE as a split terminal environment comprises a PS-domain device such as a PC and a CS-domain device such as "CS-only" phone.

"Logical database 64 comprises specific relations of IP addresses and SIP-URIs.

"Ongoing CS-calls" database 63 and "Ongoing IMS-sessions" database 61 log ongoing CS-calls and ongoing IMS-services respectively. Each CS-call and IMS-service invocation gets logged in the respective database 61, 63.

When a subsystem such as the charging subsystem 40 or the authentication subsystem 41 needs to perform a "combinational check" as to determine whether two (or more) communication session that are alleged to be combinational sessions, are truly combinational, these subsystems 40, 41 may perform the check or preferably have dedicated network nodes perform said check.

A network node, preferably the correlation node 5, is arranged to determine a correlation between a CS-call and a PS-session and performs a combinational check, as to determine whether two (or more) communication session that are alleged to be combinational sessions, are truly combinational.

The task of verifying whether a CS-call or IMS-session is actually a combinational call or session is referred to as a "combinational check." This check is, among other network entities, preferably performed by the correlation node 5, but also by dedicated correlation detection node 70 and a communication session correlation detection service 71. Said node 70 or service 71 provides a parameter, representing correlation between the CS-call and the IMS-session.

The subsystems 40, 41 perform the combinational check either by querying the "logical databases" 61, 62, 63, 64, with or without the mediator unit 60, or request dedicated nodes 5, 70, 71 to perform the correlation check or provide a parameter representing the correlation.

Performing the combination check comprises the following steps:
a) Obtain the MSISDN(A), the MSISDN(B), the SIP-URI (A) and the SIP-URI(B), based on available information in the respective service triggers and on information present in "logical databases" 61, 63;
b) Verify that a CS-call is ongoing between MSISDN(A) and MSISDN(B);
c) Verify that an IMS-session is ongoing between the SIP-URI(A) and the SIP-URI(B);
d) Verify that the SIP-URI(A) and the MSISDN(A) terminate in the same UE 1, 2 or are deployed by the same subscriber in a split-terminal environment;
e) Verify that the SIP-URI(B) and the MSISDN(B) terminate in the same UE 1, 2 or are deployed by the same subscriber in a split-terminal environment;
f) Verify that the media connection, as used by the IMS-session, terminates at the IP-addresses currently associated with the respective SIP-URIs.

ad a) Obtaining the MSISDN(B) that is in Call with MSISDN(A).

When a combinational service that is acting on behalf of the A-party does not know the MSISDN number of the B-party, the following methods are envisaged to retrieve the MSISDN(B).

Method 1: Query the A-Party UE 1.
According to this method, the A-party UE 1 (corresponding to the MSISDN(A)) is queried to which B-party it has an ongoing CS-call. This information should not be trusted, because it is provided by a non-trusted entity. However, the information provided by the UE 1 is used as a basis for a "verification-type" query that the network node 5, 70, 71, 40, 41 performs.

Method 2: Query a CS-Service within the CS Network 11, e.g. a Pre-Paid Service
Within the pre-paid service (i.e. the Pre-paid service that is currently charging the CS-call between the A-party's UE 1 and the B-party's UE 2) on behalf of the A-party, a record is available which indicates that a call is ongoing between MSISDN(A) and MSISDN (B). Hence an Application Programme Interface (API) is added to the Pre-paid service to respond to a request concerning which B-party 2 belongs to an ongoing CS-call of an A-party 1. In fact any CS-service, that is regarded as a trusted entity, which registers MSISDN(A)/MSISDN(B) pairs for ongoing calls, is queried for this check. Network element 63 with database capability provided registers MSISDN(A)/MSISDN(B) pairs and is queried directly (not shown) or is queried via mediator unit 60.

ad b) Verify that a CS-Call is Ongoing between MSISDN(A) and MSISDN(B).

The intention of this step is to verify that the MSISDN(A) and the MSISDN(B) are actually a part of the same call whereby MSISDN(A) and MSISDN(B) form the end-points of the CS-call. Such a verification is required, for instance, when the MSISDN(B) is obtained by querying the A-party UE 1, traditionally regarded as an untrusted entity. In case the MSISDN(B) is retrieved from a trusted (network) source as an implementation of "logical database" 63, this step is already implicitly fulfilled through the finding of the MSISDN(B) itself at step a). Methods to verify the ongoing CS-call between UE 1 and UE 2 are:

Method 1: Querying a Home Location Register (HLR)
   Queries are directed to an HLR for retrieving subscriber information. Via the HLR, which may use Any Time Interrogation (ATI) to obtain information from a Visitor Location Register (VLR) or a Serving GPRS Support Node (SGSN), the "state" of a subscriber is made available, whereby the subscriber is identified, in the request to the HLR, either by the International Mobile Subscriber Identity (IMSI) or by the MSISDN number (3GPP TS 23.078 v6.1.0, ch.11.3.4.1.2). The state CAMELBusy indicates that the subscriber is engaged in a transaction for a mobile originating or terminating CS-call.
   When ATI is used to obtain the state of a subscriber and the reported state by the HLR is "CAMELBusy", then the VLR should also report the MSISDN(B) that the subscriber has an ongoing CS-call with. Besides the HLR, there are other nodes such as an MSC and the VLR which are alternatively interrogated.

Method 2: Querying a CS-service, e.g. a pre-paid service
   Within a pre-paid service, that is currently charging the CS-call between the A-party and the B-party on behalf of the A-party, a record is available that indicates that a CS-call is ongoing between MSISDN (A) and MSISDN(B). By creating an API to the pre-paid service, the prepaid service responds to a request concerning which B-party belongs to an ongoing CS-call of an A-party, which makes it possible to verify whether MSISDN(A) and MSISDN(B) are involved in a CS-call. In fact any CS-service, which registers MSISDN(A)/MSISDN(B) pairs for ongoing calls, is queried for this check Method 3: Querying a CS Core Network Function, the Charging Subsystem 40
   To be able to charge for a CS-call, components of the prior art charging subsystem 40 are always involved, be it pre-paid or post-paid. An option is to extend the charging subsystem 40 with an API so that a trusted network entity queries the charging subsystem 40 to retrieve or verify the CS-call pair MSISDN(A) and MSISDN(B).

The function represented by the logical database "ongoing CS-calls" 63 must be implemented, such that all calls that are potentially combinational calls must be logged. In this way, the required combinational check is performed, when needed. Publication P19663 discloses a method how to provide an indication that a CS-call and a PS-session are probably correlated and hence combinational, and could be used as an incentive for the check presented in the invention.

An existing implementation of the "ongoing CS-calls" logical database 63 is a prior art "online charging" system. Because in this prior art system all calls are charged in real time, data from a prior art Charging System is used as "ongoing CS-calls" database 63.

Another implementation of the "ongoing CS-calls" logical database 63 is the use of a CS-service residing within the CS-network 11, which monitors all ongoing calls.

ad c) Verify that an IMS-Session is Ongoing between the SIP-URI(A) and the SIP-URI(B).

The ongoing IMS-services are logged in the logical database "Ongoing IMS-sessions" 61 dealing with ongoing IMS-services. The Session Initiation Protocol—Application System (SIP-AS) which executes an IMS-service, acts as such an "Ongoing IMS-sessions" logical database 61, and is queried by the network node 5, 70, 71, 40, 41.

ad d) Verify that the SIP-URI(A) and the MSISDN(A) Terminate in the same UE 1, 2 or are Deployed by the Same Subscriber in a Split-terminal Environment.

This task consists of three steps.

1.st step: Retrieve an IP(A) belonging to MSISDN(A) Via the HLR, regarded as an implementation of the logical database 62, information is available about a "PS-Domain Subscriber State" and a "PDP-Context Information List" of a subscriber, identified either by the IMSI or by the MSISDN (3GPP TS 23.078 v6.1.0, ch.11.3.4.1.2). The IP-address is read from "PDP Context Information" list, as specified in 3GPP TS 23.078, ch.11.3.6.1.2.

2.nd step: Retrieve the IP(A) belonging to SIP-URI(A) A SIP-Registrar function can be used as "logical database" 64 to retrieve the SIP-URI by providing the IP address.

3rd step: Compare the IP(A) addresses from the 1.st and the 2.nd step. If the first and the second step reveal the same IP(A) address, it is verified that the logical relationship MSISDN(A)->IP(A)<-SIP_URI(A) is established.

ad e) Verify that the SIP-URI(B) and the MSISDN(B) Terminate in the same UE 1, 2 or are Deployed by the Same Subscriber in a Split-terminal environment.

The same method as in ad d) above is to be used for the verification that the SIP-URI and MSISDN number terminate in the same UE of the B-party.

ad f) Verify that the Media Connection, as used by the IMS-session, Terminates at the IP-addresses Currently Associated with the Respective SIP-URIs.

According to IMS, as specified by 3GPP, the latter is always the case.

The Logical databases 61, 62, 63, 64 might be contacted by the network node 5, 70, 71, 40, 41 that perform the queries for information required to perform a combinational check. These databases are either contacted directly (not shown) via the networks 11, 12, 13, or via the mediator unit 60.

The determination of the correlation between the CS-call and the PS-session may be executed by a network entity that is arranged to perform steps of the correlation check steps and provide a parameter that represents the correlation. Such network entities are the correlation detection node 70 and the communication session correlation detection service 71 that provide a parameter, representing the correlation. Node 70 and service 71 query the same logical databases in the same way as explained at the action applied by correlation node 5.

Further network entities which may provide a parameter that represents the correlation, as to determine the correlation between the CS-call and the PS-session are: an application running at the first UE 1, the logical databases 61, 62, 63, 64 or the mediator unit 60.

Figure 2:
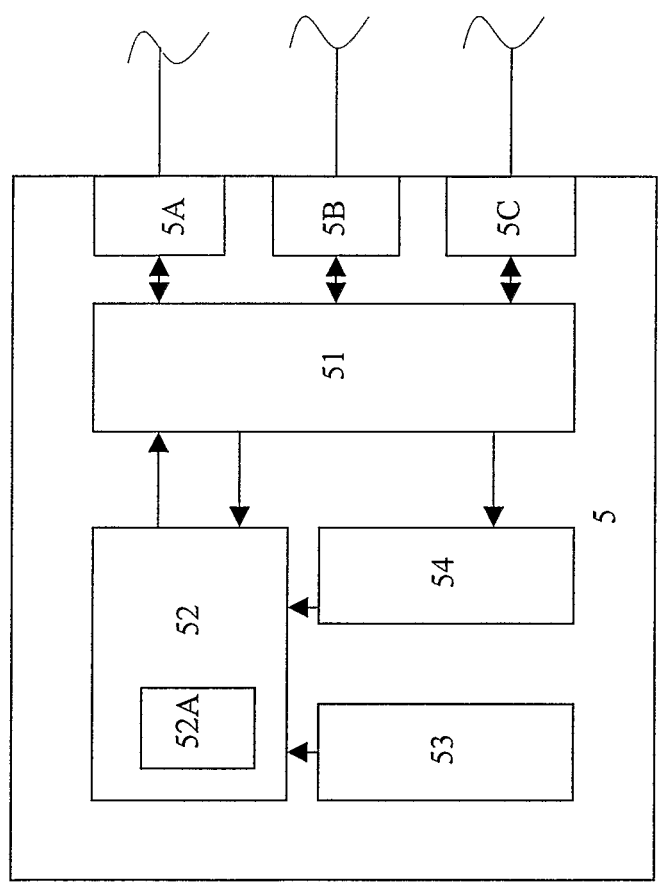
FIG. 2 presents a schematic diagram of a network node.

With reference to FIGS. 1 and 2, the correlation node 5 will be described.

The network node 5, denoted as the correlation node, is arranged for providing information, such as a determined correlation, of related communication sessions between the UE 1 and the UE 2 or the network entity 34, to subsystems such as the charging node 40 or the authentication node 41 via its network connections 34A, 34B, 34C, each associated with a network address, to two or more of the networks (11, 12, 13).

This network node 5 is arranged for:
establishing that simultaneous communication sessions at each of the networks 11, 12, 13, between the UE 1 and the UE 2 or the network entity 34 are actually present;
determining the correlation between the established present simultaneous communication sessions and,
providing the subsystem 40, 41 with the determined correlation.

The network node 5 comprises an Input Output (I/O) unit 51 that is communicatively connected to the networks 11, 12, 13, by means of the network connections 5A, 5B, 5C, where the I/O unit is arranged for retrieving network addresses of the UE 1, the UE 2 or the network entity 34 via the networks 11, 12, 13.

The network node 5 further comprises a processing unit 52 with application program- and parameter-memory 52A, arranged for querying any one of the network elements having database capabilities 61, 62, 63, 64 or the mediator unit 60 representing said network entities, the UE 1, the UE 2, the network entity 34, the communication session correlation detection node 70 or the communication session correlation detection service 71, for verifying the presence of the communication sessions.

The network node 5 further comprises a timer unit 53 for determining events when the subsystem 40, 41 is to be provided with the information and an event unit 54, arranged for activating the processing unit 52 as to provide the subsystem 40, 41 with the information, when an event is received from the UE 1, UE 2 or the network entity 34. The event unit 54 is further arranged for activating the processing unit 52 as to provide the subsystem 40, 41 with the requested information, when a request for the information is received from the subsystem 40, 41.

The present invention enables a check whether a particular CS-call and a PS-session are correlated and hence regarded as combinational. As this check is executed during the CS-call or a PS-session, this check qualifies as a "real time" check, which enables e.g. charging systems to adapt a charging rate during said call/session as compared to an off-line or batch calculation of a call/session charge.

By introduction of the invention as presented there is a mechanism provided to introduce flexibility that makes it possible for an operator to apply charging a combination of a simultaneous CS-call and a PS-session by the same subscriber and hence provides extension on prior art charging solutions where the CS-call and the PS-session, although being related to each other, were charged independently.

What makes charging for a combinational service different is the additional flexibility (and the requirements indicated by operators) to be able to charge for an aggregate service composed of a circuit switched borne service and one or more packet switched borne services as opposed to the native and established charging capabilities for circuit switched and packet switched domains. For example, if an A-party has an ongoing CS-call with a B-party, it should be possible for the A-party and the B-party to send pictures to one another and the resulting combinational call would be charged differently compared to an IMS session set up in isolation.

What is claimed is:

1. A method for providing a verification of whether a call via a Circuit Switched (CS) network and a related Packet Switched session via a Packet Switched (PS) network are combinational, within a telecommunications system comprising said PS and CS networks, where the PS and CS networks are connecting at least a first user equipment and a network entity, where each of the first user equipment and the network entity has a respective connection associated with a respective PS network address in the PS network and a respective connection associated with a respective CS network address in the CS network, the method comprising the steps of:
establishing a presence of the call in the Circuit Switched network and the related PS session in the Packet Switched network, between the first user equipment and the network entity, the call and the related PS session being present simultaneously,
in response to the presence of the call and the related PS session being established, performing a real-time combinational check verifying that the call and the related PS session originate at the first user equipment and terminate at the network entity;
providing at least one subsystem with the verification of the performed real-time combinational check.

2. The method according to claim 1, wherein the establishing step further comprises:
retrieving the first user equipment's CS network address;
retrieving the CS network address of the network entity that has the call with the first user equipment via the Circuit Switched network;
verifying the presence of the call using the CS network addresses;
retrieving the first user equipment's PS network address;
retrieving the PS network address of the network entity that has the related PS session with the first user equipment via the PS network;
verifying the presence of the related PS session using the PS network addresses.

3. The method according to claim 2, wherein the retrieving steps are performed by querying network elements having database capabilities or a mediator unit representing said network elements.

4. The method according to claim 3 wherein at least one of the PS network addresses is a SIP-URI and either the network elements that provide the database capabilities or the mediator unit provides a relation between the SIP-URI and an IP address.

5. The method according to claim 3 wherein at least one of the CS network addresses is an MSISDN, a PSTN, or a VPN number and either the network elements that provide the database capabilities or the mediator unit provides a relation between the MSISDN, PSTN or VPN number, and an IP address.

6. The method according to claim 3 wherein either the network elements that provide the database capabilities or the mediator unit provides information, including a CAMELBusy parameter, indicating whether the call between the first user equipment and the network entity is ongoing.

7. The method according to claim 3 wherein either the network elements that provide the database capabilities or the mediator unit provides information indicating whether the related Packet Switched session between the first user equipment and the network entity is ongoing.

8. The method according to claim 2 wherein at least one retrieving step is performed by querying the first user equipment or the network entity, for the CS network address of the first user equipment or the network entity via the packet switched network.

9. The method according to claim 2 wherein the verification step is performed by querying the first user equipment, the network entity, network elements or a mediator unit for a parameter, representing involvement in a communication session, of the first user equipment or the network entity.

10. The method according to claim 1 wherein the step of the real-time combinational check comprises the further steps of:
   verifying that the related PS session and the Circuit Switched network call of the first User Equipment terminate in the same User Equipment or are deployed by a same subscriber in a split-terminal environment;
   verifying that the related PS session and the Circuit Switched network call of the network entity terminate in the same User Equipment or are deployed by a same subscriber in a split-terminal environment; and
   verifying that a media connection, as used by the Packet Switched session, terminates at Internet Protocol addresses currently associated with the respective Packet Switched network addresses of the first user equipment and the network entity.

11. The method according to claim 1, wherein at the performing step the call and the related PS session are regarded as combinational when a communication session correlation detection node or a communication session correlation detection service provides a parameter, representing correlation between the call and the related PS session.

12. The method according to claim 1, wherein at the performing step the call and the related PS session are regarded as combinational when an application at the first user equipment provides a parameter, representing correlation between the call and the related PS session.

13. The method according to claim 1, wherein the providing step is performed by request of the at least one subsystem, on events generated by the first user equipment or the network entity, or on regular intervals.

14. The method according to claim 1 wherein the providing step further comprises a step of providing the at least one subsystem with at least one of: the CS network address of the first user equipment, the PS network address of the first user equipment, the CS network address of the network entity, or the PS network address of the network entity.

15. The method according to claim 1 wherein the network entity is a second user equipment or a network service node.

16. The method according to claim 15, wherein the first or the second user equipment comprises a terminal, the terminal comprising a Dual Transfer Mode (DTM) terminal, a Global System for Mobile communications-General Packet Radio System (GSM-GPRS) terminal or a Universal Mobile Telecommunication System Multi Radio Access Bearer (UMTS Multi-RAB) terminal.

17. The method according to claim 16 where the terminal has a wire-line connection to at least one of the CS and PS networks or a wireless connection to at least one of the CS and PS networks.

18. The method according to claim 15, the first or the second user equipment comprising two or more terminals where each of the terminals has at least one connection to each of the CS network and the PS network and a network address corresponding to each of the at least one connections.

19. The method according to claim 18 wherein the two or more terminals are capable of deploying a communication session including speech, audio, video, or data, by means of a telephone, headset, Global System for Mobile communications (GSM) terminal, Advanced Mobile Phone System (AMPS) or Digital AMPS (D-AMPS) terminal, Digital Enhanced Cordless Telephony (DECT) terminal, Bluetooth terminal, Universal Mobile Telecommunication System (UMTS) terminal, video terminal, Personal Computer (PC) or workstation.

20. The method according to claim 1 wherein each of the CS network addresses is a telephone subscriber number being one of a Mobile Station Integrated Services Digital Network (MSISDN) number, a Public Switched Telecommunications Network (PSTN) number, a Virtual Private Network (VPN) private number, or a number according to a E.164 International Telecommunication Union (ITU) recommendation.

21. The method according to claim 1 wherein each of the PS network addresses is a PS network identifier or number, the number including one of a SIP Uniform Resource Indicator (URI), an Internet Protocol (IP) address, or a Local Area Network (LAN) Media Access Control (MAC) layer address such as an Ethernet MAC address.

22. The method according to claim 1, wherein the real-time combinational check and the network addresses are provided to a charging subsystem, so as to apply a discount in charging two or more of the related simultaneous call and packet switched session.

23. A network node in a telecommunication system, the network node being configured for providing a verification of whether a call via a Circuit Switched (CS) network and a related Packet Switched (PS) session via a Packet Switched network are combinational, wherein the telecommunication system comprises at least said CS and PS networks, the CS and PS networks being connected to at least a first user equipment and a network entity, where each of the first user equipment and the network entity has a respective connection associated with a respective PS network address in the PS network and a respective connection associated with a respective CS network address in the CS network, wherein the network node comprises:
   an Input Output (I/O) unit communicatively connected to the at least CS and PS networks, by means of network connections, each network connection having a network address,
   a processing unit with an application program and a parameter memory for querying network elements having database capabilities or a mediator unit representing said network elements, where the I/O unit in cooperation with the processing unit is configured for establishing the presence of the call and the related PS session simultaneously at each of the at least CS and PS networks, between the first user equipment and the network entity,
   the network node being configured for performing, in response to the presence of the call and the related PS session being established, a real-time combinational check to verify that the call and the related PS session originate at the first user equipment and terminate at the network entity, and
   the network node being further configured for providing a verification of the performed real-time combinational check to at least one subsystem.

24. The network node according to claim 23, wherein the I/O unit is configured for retrieving network addresses of the first user equipment or the network entity via the CS and PS networks.

25. The network node according to claim 23, wherein the processing unit with the application program and the parameter memory is further configured for querying the first user equipment, a communication session correlation detection node, a communication session correlation detection service via said correlation detection node or the network entity, to verify the presence of the simultaneous call and related packet switched session.

26. The network node according to claim 23, wherein the network node further comprises a timer unit for determining events when the at least one subsystem is to be provided with the verification.

27. The network node according to claim 23, wherein the network node further comprises an event unit, configured for activating the processing unit so as to provide the at least one subsystem with the verification, when an event is received from the first user equipment or the network entity.

28. The network node according to claim 27, wherein the event unit is further configured for activating the processing unit so as to provide the at least one subsystem with the verification, when a request for the verification is received from the subsystem.

29. The network node according to claim 23, wherein at least one of the CS network address of the first user equipment and the CS network address of the network entity is a telephone subscriber number being one of a Mobile Station Integrated Services Digital Network (MSISDN) number, a Public Switched Telecommunications Network (PSTN) number, a Virtual Private Network (VPN) private number, or a number according to a E.164 International Telecommunication Union (ITU) recommendation.

30. The network node according to claim 23, wherein at least one of the PS network address of the first user equipment and the PS network address of the network entity is one of: a PS network identifier, a Local Area Network (LAN) Media Access Control (MAC) layer address, or an Internet Protocol (IP) address.

\* \* \* \* \*